T. CASTOR.
Street-Cars.
No. 6,060. Reissued Sept. 22, 1874.
FIG. I.
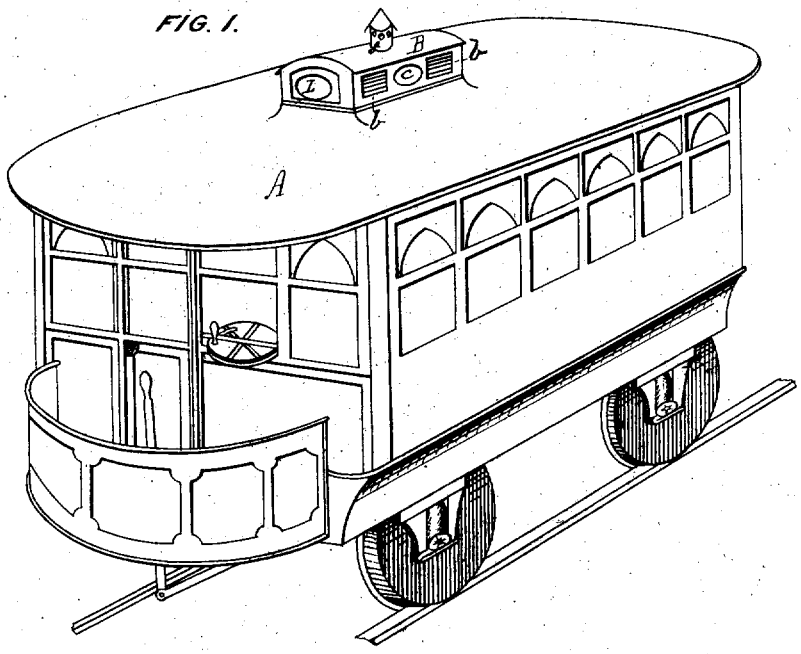
FIG. II.
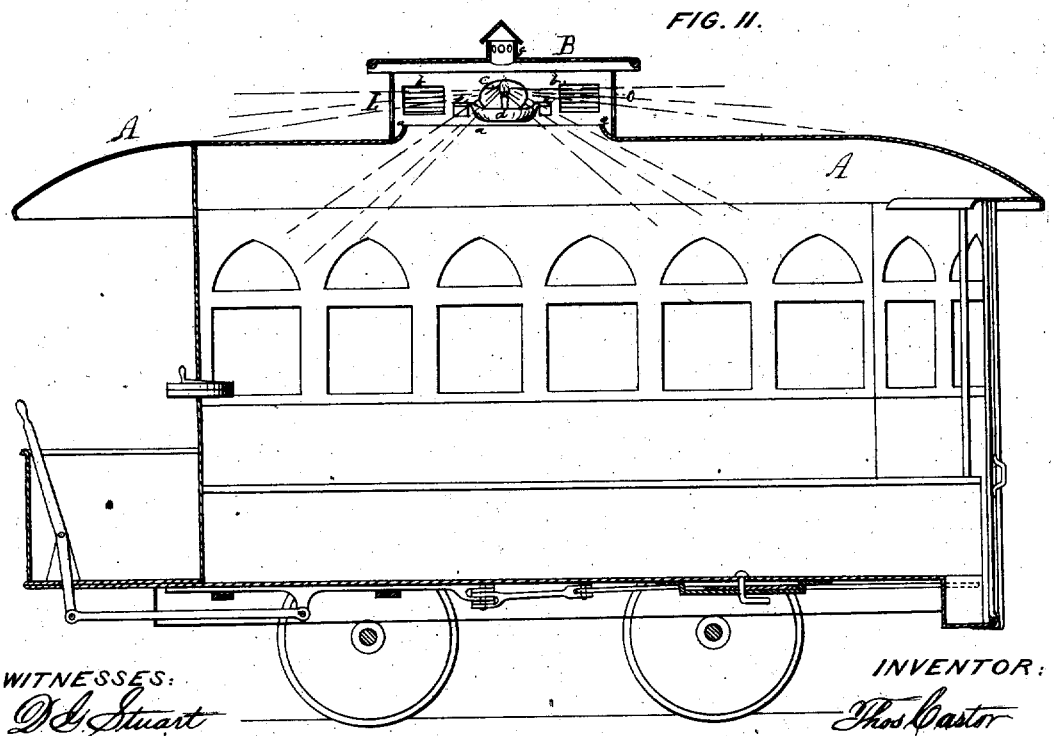
WITNESSES:
D. L. Stuart
J. J. Knight
INVENTOR:
Thos Castor
per P. Hanway
Attorney
THE GRAPHIC CO. PHOTO-LITH. 39 & 41 PARK PLACE, N.Y.

UNITED STATES PATENT OFFICE.

THOMAS CASTOR, OF PHILADELPHIA, PENNSYLVANIA, ASSIGNOR, BY MESNE ASSIGNMENTS, TO JOHN STEPHENSON, OF NEW YORK CITY.

IMPROVEMENT IN STREET-CARS.

Specification forming part of Letters Patent No. 32,681, dated July 2, 1861; reissue No. 6,060, dated September 22, 1874; application filed August 3, 1874.

DIVISION D.

*To all whom it may concern:*

Be it known that I, THOMAS CASTOR, of Philadelphia, in the State of Pennsylvania, have invented a certain new and useful Improvement in the Construction of Street-Cars, of which the following is a specification, reference being had to the accompanying drawing making part of this specification, in which—

Figure 1 represents a view, in perspective, of a street-car having my improvement applied thereto; and Fig. 2, a vertical longitudinal section of the same.

This division of my original patent relates to a new and improved construction of street-cars; and it consists in constructing the roof of the car with an elevation or dome, in which are arranged certain devices for the following purposes, to wit: First, in which to arrange a system of ventilation above the line of the roof, for the purpose of carrying off the impurities of the atmosphere within the car; secondly, in which to arrange transparent mediums for the purpose of forming signals for night service; and, thirdly, in which to suspend a light by which to light up the transparencies for signal purposes, and at the same time illuminate the interior of the car.

To enable others skilled in the art to make, construct, and use my improvement, I will now proceed to describe its parts in detail, omitting a particular description of such parts of a street-car as are non-essential to a full understanding of this branch of my invention.

The body proper of the car and its running-gear may be made in any known way, as such forms no part of this improvement, with the exception of the roof A, which is provided with an elevated chamber or dome, B. For this purpose a large opening is formed in the roof, the edge of which is raised up all round in the manner of a flange or lip, *a*. Over this lip is fitted the dome B, which is then properly secured to the roof. The side walls of this dome B are provided with one or more protected openings, *b*, which act as ventilators, and with another opening, *c*, covered with glass or other transparent medium, to form a signal for night service. Each end of the dome may be also provided with an opening or openings covered with glass or other transparent medium, one or both of which may be colored to form signals for night service. When both are colored, they may be of different hues. L represents the opening toward the front, and O the one toward the rear of the car. The side transparencies *c* may be colored also, if desired. Inside of the dome is secured a spider or frame, *e*, for the support of the lamp *d*, and should be so arranged as to bring the light in a line with the openings *c*, L, and O in the ends and sides of the dome. Immediately above the light is arranged a chimney, *f*, the wall of which is pierced with a number of openings to carry off the products of combustion of the lamp, and in that respect acts, also, as a ventilator to the car.

The lamp thus arranged serves as well to light up the signal-transparencies as to illuminate the interior of the car.

Having thus described my invention, what I claim as new, and desire to secure by Letters Patent, is—

1. The combination of a street-car body and a dome, B, with ventilating-openings, substantially as and for the purposes set forth.
2. The combination of a street-car body and a dome, B, with transparent signal-panels, substantially as and for the purposes set forth.
3. The combination of a street-car body and a dome, B, with ventilating-openings and transparent signal-panels, substantially as and for the purposes set forth.
4. The combination of a street-car body, a dome, B, with transparent signal-panels, and a lamp in a plane with the panels, substantially as and for the purposes set forth.
5. The combination of a street-car body, a dome, B, with transparent signal-panels and ventilating-openings, and a lamp, substantially as and for the purposes set forth.

THOS. CASTOR.

Witnesses:
WM. HALL WAXLER,
DANIEL R. HART.